(12) United States Patent
Ahn

(10) Patent No.: US 11,545,041 B2
(45) Date of Patent: Jan. 3, 2023

(54) METHOD OF AVOIDING COLLISION OF UNMANNED AERIAL VEHICLE

(71) Applicant: PABLO AIR Co., Ltd., Incheon (KR)

(72) Inventor: Seoung Gyu Ahn, Daejeon (KR)

(73) Assignee: PABLO AIR CO., LTD., Incheon (KR)

( * ) Notice: Subject to any disclaimer, the term of this patent is extended or adjusted under 35 U.S.C. 154(b) by 267 days.

(21) Appl. No.: 16/905,637

(22) Filed: Jun. 18, 2020

(65) Prior Publication Data

US 2021/0272466 A1 Sep. 2, 2021

(30) Foreign Application Priority Data

Feb. 28, 2020 (KR) ........................ 10-2020-0024795

(51) Int. Cl.
*G08G 5/04* (2006.01)
*B64C 39/02* (2006.01)
*G08G 5/00* (2006.01)

(52) U.S. Cl.
CPC .......... *G08G 5/045* (2013.01); *B64C 39/024* (2013.01); *G08G 5/0039* (2013.01); *B64C 2201/12* (2013.01); *B64C 2201/141* (2013.01)

(58) Field of Classification Search
CPC .... G08G 5/045; G08G 5/0039; B64C 39/024; B64C 2201/12; B64C 2201/141
See application file for complete search history.

(56) References Cited

FOREIGN PATENT DOCUMENTS

| CN | 105717942 B | * | 7/2018 | ............. G05D 1/101 |
|---|---|---|---|---|
| CN | 106647812 B | * | 6/2019 | ............. G05D 1/101 |
| CN | 110567478 A | * | 12/2019 | |
| CN | 107102650 B | * | 1/2020 | ............. G05D 1/101 |
| EP | 1901153 A1 | | 3/2008 | |
| KR | 10-2013-0094533 A | | 8/2013 | |
| KR | 10-1501528 B1 | | 3/2015 | |
| KR | 10-2019-0004176 A | | 1/2019 | |
| WO | 2018/190834 A1 | | 10/2018 | |

OTHER PUBLICATIONS

Hasini Viranga Abeywickrama et al., "Algorithm for Energy Efficient Inter-UAV Collision Avoidance", 17th International Symposium on Communications and Information Technologies (ISCIT), 2017.

Li, Wenhao "An Improved Artificial Potential Field Method Based on Chaos Theory for UAV Route Planning", 2019 34th Youth Academic Annual Conference of Chinese Association of Automation (YAC), IEEE, Jun. 6, 2019, p. 47-51.

* cited by examiner

*Primary Examiner* — Frederick M Brushaber
*Assistant Examiner* — Elizabeth Yang
(74) *Attorney, Agent, or Firm* — Novick, Kim & Lee PLLC; Jae Youn Kim

(57) ABSTRACT

Provided is a method of avoiding collision of an unmanned aerial vehicle with an obstacle, the method including: calculating two potential fields using ament positional information of the unmanned aerial vehicle, a target point that is set, and positional information of the obstacle measured by a sensor, computing an attractive force and a repulsive force by differentiating the computed potential fields, respectively; computing a direction of a potential force that results from adding up the computed attractive force and repulsive force; and performing control that brings about a change from the computed direction of the potential force to a direction in which the unmanned aerial vehicle moves.

15 Claims, 11 Drawing Sheets

(8 of 11 Drawing Sheet(s) Filed in Color)

| | |
|---|---|
| • State transition | $A = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix}$ |
| • Kalman error covariance | $P = I_4$ |
| • Process noise covariance | $Q = \begin{bmatrix} 1 & 0 & 0 & 0 \\ 0 & 1 & 0 & 0 \\ 0 & 0 & 5 & 0 \\ 0 & 0 & 0 & 5 \end{bmatrix}$ |
| • Measurement state transition | $H = \begin{bmatrix} 1 & 0 & 0 & 0 \\ 0 & 1 & 0 & 0 \end{bmatrix}$ |
| • Measurement noise covariance | $R = \begin{bmatrix} 0.01 & 0 \\ 0 & 0.01 \end{bmatrix}$ |
| • Measurement Matrix | $z_k = [x_O \ y_O]^T$ |

FIG. 1B

METHOD OF AVOIDING COLLISION OF UNMANNED AERIAL VEHICLE

CROSS REFERENCE TO RELATED APPLICATION

The present application claims priority to Korean Patent Application No. 10-2020-0024795, filed on Feb. 28, 2020 the entire contents of which is incorporated herein for all purposes by this reference.

BACKGROUND OF THE INVENTION

Field of the Invention

The present invention relates to a method of avoiding collision of an unmanned aerial vehicle and more particularly, to a method of avoiding collision of an unmanned aerial vehicle on the basis of a potential field taking into consideration a relative velocity of an obstacle.

Description of the Related Art

When damaged due to collision in the air, an unmanned aerial vehicle is highly likely to fall to the ground. In such a case, there is a high risk of causing losses of both life and property or a forest fire. Particularly, a collision in a downtown area is highly likely to cause a loss of life. Thus, it is necessary to prevent unexpected collision. In addition, with the development of the industry related to unmanned aerial vehicles, there is an increasing concern with collision avoidance. Accordingly, research has been made on sensors and algorithms for collision avoidance.

Devices for recognizing and avoiding collision of the unmanned aerial vehicle are broadly categorized into collaborative sensors that exchange pieces of data by communicating with a counterpart aircraft using transponders such as a traffic collision avoidance system (TCAS) and automatic dependent surveillance broadcast (ADSB), and non-collaborative sensors, such as a radar, an image sensor, and LiDAR, that obtain information by making a measurement. The cooperative sensor is a sensor that transmits and receives pieces of information, such as a position, altitude, and velocity of the obstacle. The cooperative sensor is unsuitable for avoiding collision with an expected obstacle or a terrain feature because a primary objective thereof is to avoid collision between unmanned aerial vehicles or collision with a manned aerial vehicle. On the other hand, the non-collaborative sensor can recognize an obstacle on the basis of information measured by a sensor and can detect collision with the obstacle and avoid the collision therewith. Thus, it is possible not only to avoid a terrain feature, but also to avoid collision with an expected obstacle.

Algorithms that are applicable to existing unmanned aerial vehicles include a collision avoidance algorithm based on a potential field technique, a collision avoidance algorithm using geometric information, a collision avoidance algorithm using a bearing angle, a collision avoidance algorithm using an optical flow, and soon.

The collision avoidance algorithm using the bearing angle, which is an algorithm for avoiding collision by keeping an obstacle at a safe position in the field of view of an image sensor, may be difficult to utilize in a situation where various obstacles are recognized by the image sensor. The collision avoidance algorithm using the optical flow, which is also an algorithm for avoidance through computation of the optical flow, may be difficult to utilize in a downtown area where obstacles are omnidirectionally recognized. The collision avoidance algorithm based on the potential field technique is an algorithm for avoiding collision with a force that is obtained by adding up an attractive force and a repulsive force that are generated by utilizing information of an obstacle obtained by a sensor. For this reason, it is determined that the collision avoidance algorithm based on the potential field technique is suitable for collision avoidance in a complex situation. However, a general potential field results from considering only a distance to an obstacle, and thus has poor performance in terms of avoiding a moving obstacle. In this manner, an existing collision avoidance algorithm is not designed as a result of considering characteristics of a downtown area where high-rising buildings are highly packed together and where an unexpected situation is highly likely to occur. Thus, it is necessary to discuss whether it is possible to utilize an existing algorithm in the downtown area.

Examples of the related art include Korean Unexamined Patent Application Publication No. 2019-0004176 titled "APPARATUS AND METHOD FOR AVOIDING COLLISION OF UNMANNED AERIAL VEHICLE WITH OBSTACLE" and Korean Patent No. 10-1501528 titled "SYSTEM AND METHOD FOR PREVENTING COLLISION OF UNMANNED AERIAL VEHICLE."

SUMMARY OF THE INVENTION

An objective of the present invention is to provide an algorithm which prevents collision in an area where obstacles are highly packed together.

Another objective of the present invention is to provide an algorithm which prevents collision when any object other than a specific object has the risk of collision.

Still another objective of the present invention is to provide an algorithm which presents collision not only in an expected situation, but also in a situation that is difficult to predict.

Still another objective of the present invention is to provide an algorithm which prevents collision not only with a stationary obstacle, but also with a moving obstacle.

Still another objective of the present invention is to provide an obstacle detection sensor that is capable of being mounted on an unmanned aerial vehicle.

According to an aspect of the present invention, there is provided a method of avoiding collision of an unmanned aerial vehicle with an obstacle, the method including: calculating two potential fields using current positional information of the unmanned aerial vehicle, a target point that is set, and positional information of the obstacle measured by a sensor, computing an attractive force and a repulsive force by differentiating the computed potential fields, respectively, computing a direction of a potential force that results from adding up the computed attractive force and repulsive force; and performing control that brings about a change from the computed direction of the potential force to a direction in which the unmanned aerial vehicle moves.

With a method of avoiding collision of an unmanned aerial vehicle according to the present invention, an algorithm which prevents collision in an area where obstacles are highly packed together, and thus the unmanned aerial vehicle can be prevented from colliding an obstacle. In addition, according to the present invention, a collision avoidance algorithm which prevents collision with a moving obstacle, as well as with a stationary obstacle, is avoidable is provided. This provides the advantage that collision is also avoidable in a situation that is difficult to predict.

In addition, according to the present invention, LiDAR is used as an obstacle detection sensor that senses an obstacle. This provides performance that is higher than is the case with any other sensor.

BRIEF DESCRIPTION OF THE DRAWINGS

The patent or application file contains at least one drawing/photograph executed in color. Copies of this patent or patent application with color drawing(s)/photograph(s) will be provided by the Office upon request and payment of the necessary fee.

FIGS. 1A and 1B are respectively a block diagram and a table that show an algorithm of a Kalman filter and constituent elements of the Kalman filter according to the present invention;

DETAILED DESCRIPTION OF THE INVENTION

Figure 1A:
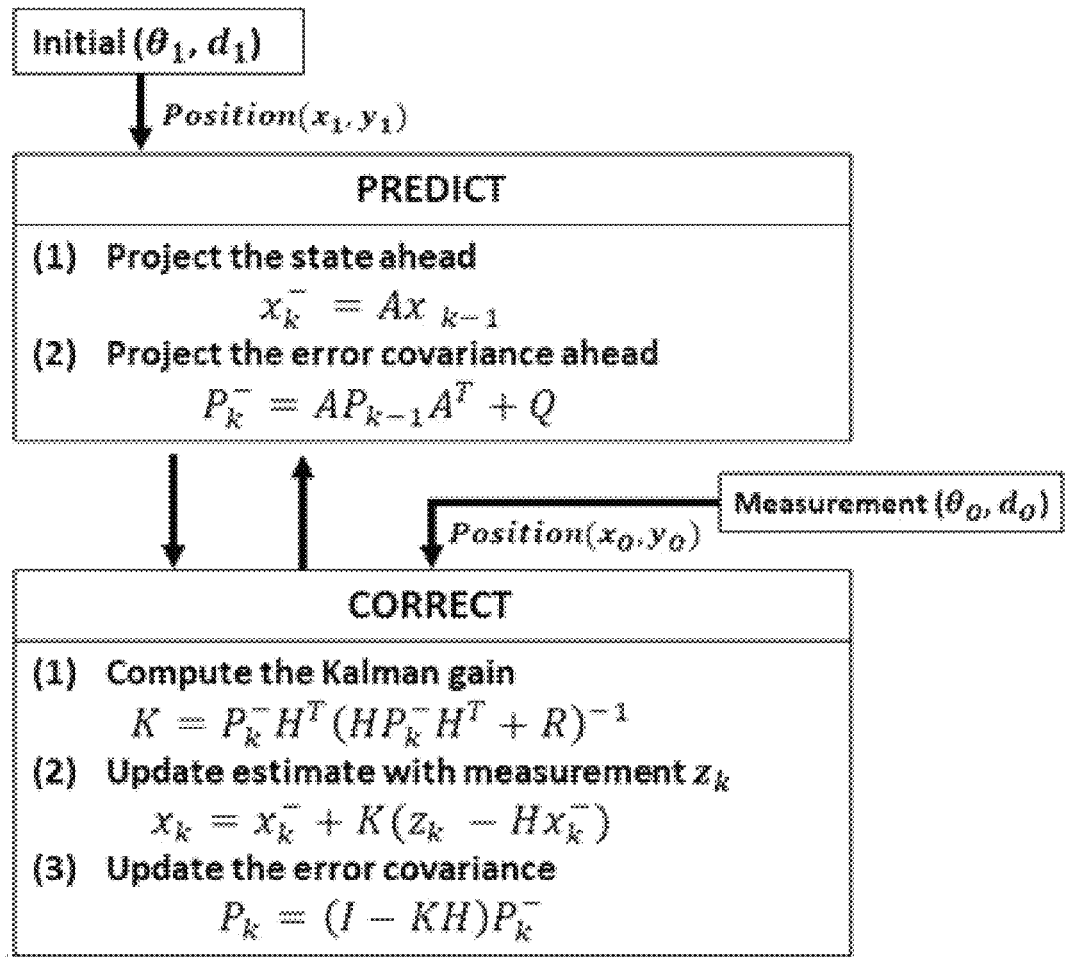

The above-described aspects of the present invention and additional aspects thereof will be apparent from a preferable embodiment that will be described with reference to the accompanying drawings. Descriptions will be provided below so in sufficient detail that a parson of ordinary skill in the art clearly can understand and implement the embodiment of the present invention.

A potential field generates a repulsive force against an obstacle and thus achieves avoidance. Because of this, an algorithm is not complicated, and computation is simple. Thus, collision is sufficiently avoidable in a downtown area where obstacles are tightly packed together. A collision avoidance algorithm based on the potential field generates the potential field with respect to a surrounding situation. The avoidance is achieved on the basis of the generated potential field. Because of this, the collision is avoidable in a manner that is suitable for the surrounding situation.

According to the present invention, as an obstacle detection sensor, LiDAR which can recognize a specific object and can be mounted in an unmanned aerial vehicle is used.

A general potential field is given as a function of a distance to an obstacle, and thus has poor performance in avoiding a moving obstacle. According to the present invention, a velocity relative to the obstacle is taken into consideration when generating the potential field. Thus, the performance in avoiding the moving obstacle is improved.

In addition, according to the present invention, in order to compensate for a disadvantage of the general potential field, the potential field is generated considering the velocity relative to the obstacle. Furthermore, performance of a proposed collision avoidance algorithm is verified through modeling and simulation of an urban environment, and an analysis is made in comparison with an existing potential field.

The collision avoidance algorithms according to the present invention are broadly divided into three parts. First, various obstacles, such as buildings in a downtown area and other unmanned aerial vehicles including an intruding unmanned aerial vehicle, are detected, and a potential collision with the detected obstacle is recognized. According to the present invention, LiDAR that is used as a detection sensor detects an obstacle. Obstacle detection that uses LiDAR omnidirectionally detects an obstacle using Radar-LiDAR, and, when the detected object comes within a fixed range, determines it as an obstacle. Second, in a case where a potential collision of the unmanned aerial vehicle is recognized, a collision avoidance direction is determined, taking into consideration a distance between the unmanned aerial vehicle and the obstacle, a direction and velocity of the obstacle, and a velocity of the unmanned aerial vehicle. The collision avoidance algorithm according to the present invention determines a direction in which the unmanned aerial vehicle can avoid collision. Last, the unmanned aerial vehicle moves in the direction of avoiding a collision. While avoiding the collision in a downtown area, the unmanned aerial vehicle may experience a local minima phenomenon where an unmanned aerial vehicle flies repeatedly within a fixed section. According to the present invention, when determined as experiencing the local minima phenomenon, the unmanned aerial vehicle can overcome the local minima phenomenon by adjusting a potential gain.

Obstacle detection sensors for avoiding the collision of the unmanned aerial vehicle are broadly categorized into collaborative sensors that exchange pieces of data on an obstacle by communicating with a counterpart aircraft and a control system using transponders such as TCAS and ADSB, and non-collaborative sensors, such as an image sensor, a radar, and LiDAR, that determine an obstacle using measurement information.

LiDAR can acquire information on a distance to a detection target in a 2D or 3D coordinate frame while a laser-based module rotates. According to a method of modulating a laser signal, LiDAR comes in two types: a time-of-flight (TOF) type and a phase-shift type. According to the present invention, as illustrated above, among non-collaborative sensors, LiDAR that can measure the distance to the obstacle and the direction thereof is utilized as a sensor for determining the obstacle.

Particularly, in measuring the distance to the obstacle, LiDAR according to the present invention is capable of making a measurement by a total of 30° at intervals of 2° using a total of 16 channels, with respect to the vertical axis, and is capable of making a measurement by 360° at operator-set intervals around the unmanned aerial vehicle, with respect to the horizontal axis.

A selected obstacle detection sensor (LiDAR), which is a sensor that measures the direction of the obstacle and the distance thereto, can know a relative position of the obstacle, but cannot measure a velocity of the obstacle. It is determined that velocity information on the obstacle is necessary for avoidance of collision with a mobile obstacle. According to the present invention, the velocity of the obstacle is estimated based on a change in a position of the obstacle. As a filter for estimation, a Kalman filter is used that can predict a state of the obstacle on the basis of the previous state thereof, in a case where the velocity of the obstacle cannot be estimated and the obstacle cannot be measured due to a limitation of the sensor.

The Kalman filter performs two phases, a prediction phase and a connection phase. The first phase is a phase in which, for prediction, the next estimation value is computed from a previous estimation value through a system model. The second phase is a phase in which, for correction, the predicted state is corrected by applying data measured in the sensor to the computed estimation value.

In the prediction phase, the next state is predicted from an initial state ($x_o$) or a correction value ($x_k$) through the system model (A). Then, a change in Kalman filter error covariance ($P_k$) due to the prediction of the next state is computed. Equation 1 and Equation 2 are equations that correspond to the prediction phase. $x_k^-$ and $P_k^-$ mean the predicted sate and the error covariance, respectively. $w_k$ and Q mean noise and system nose covariance, respectively, which are generated by the prediction.

$$x_k^- = Ax_{(k-1)} + w_k \quad \text{Equation 1}$$

$$P_k^- = AP_{(k-1)}A^T + Q \quad \text{Equation 2}$$

where k denotes a step that is used for a Kalman filter variable. A variable of the next step is computed by utilizing a variable of the previous step.

In the correction phase, a Kalman gain (K) is computed from the Kalman filter error covariance and a measurement error covariance (R). A state predicted with a measurement value and the Kalman gain is connected. Then, the Kalman filter error covariance changed due to the connection is computed. Equations 3 to 5 are equations that correspond to the connection phase. H is a matrix representing a relationship between a measurement value and a state variable.

$$K = P_k^- H^T (HP_k^- H^T + R)^{-1} \quad \text{Equation 3}$$

$$x_k = x_k^- + K(z_k - Hx_k^-) \quad \text{Equation 4}$$

$$P_k = (I - KH)P_k^- \quad \text{Equation 5}$$

According to the present invention, measurement values are an angle with the obstacle and a distance relative thereto, which are obtained from LiDAR. As measurement values, an x-axis distance and a y-axis distance ($x_0$, $y_0$) to the obstacle, which result from conversion, are used instead of an angle ($\theta_O$) with the obstacle and a distance ($d_O$) thereto.

$$x_0 = \cos\theta_0 \times d_0 \quad \text{Equation 6}$$

$$y_0 = \sin\theta_0 \times d_0 \quad \text{Equation 7}$$

In the prediction phase, the next state is estimated from the previous estimation value and the system model, and the changed covariance is estimated while the next state is estimated, hi the collection phase, the Kalman gain is computed on the basis of the estimated covariance and a covariance of the measurement value, and the estimated state is corrected on the basis of a difference between a measurement value of the sensor and a prediction value. Then, a pre-correction covariance is again computed.

FIGS. 1A and 1B are a block diagram and a table that show an algorithm of the Kalman filter and constituent elements of the Kalman filter, respectively, according to the present invention.

In order to verify an algorithm for estimating the velocity of the obstacle, which is realized with the Kalman filter, a simulation for detection of the obstacle and estimation of the velocity thereof is realized. The simulation is realized in such a manner that performance of the algorithm in terms of LiDAR accuracy and performance of the algorithm in terms of the horizontal-axis LiDAR resolution are comparable. Through the simulation, the performances of the algorithms for estimation of the velocity of the obstacle in terms of LiDAR accuracy and in terms of the horizontal-axis LiDAR resolution were verified. Simulation environments for comparison of the performances of the algorithms in terms of LiDAR accuracy are illustrated as in Table 1.

TABLE 1

|  | Case 1 | Case 2 | Case 3 |
| --- | --- | --- | --- |
| Simulation time | 500 sec | 500 sec | 500 sec |
| Step size | 0.01 sec | 0.01 sec | 0.01 sec |
| Object velocity | about 5 m/s | about 5 m/s | about 5 m/s |
| LiDAR accuracy | ±3 cm | ±10 cm | ±20 cm |
| Resolution (Horizontal) | 1° | 1° | 1° |

Figure 3:
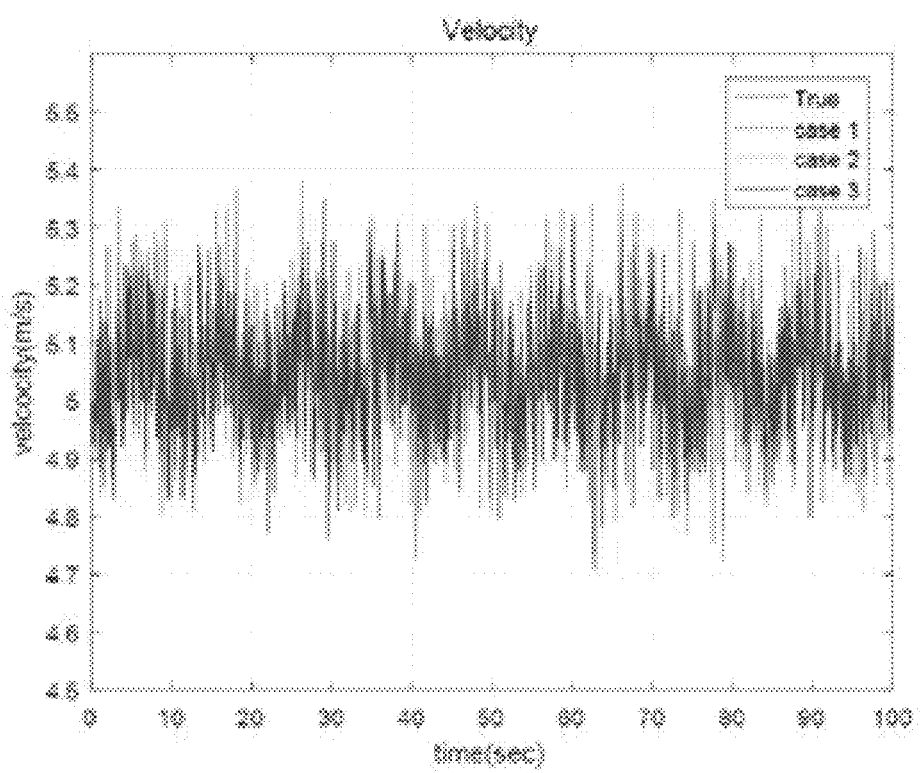
FIG. 3 is a graph comparing an actual velocity of an obstacle and a velocity that is estimated with the Kalman filter.
Figure 4:
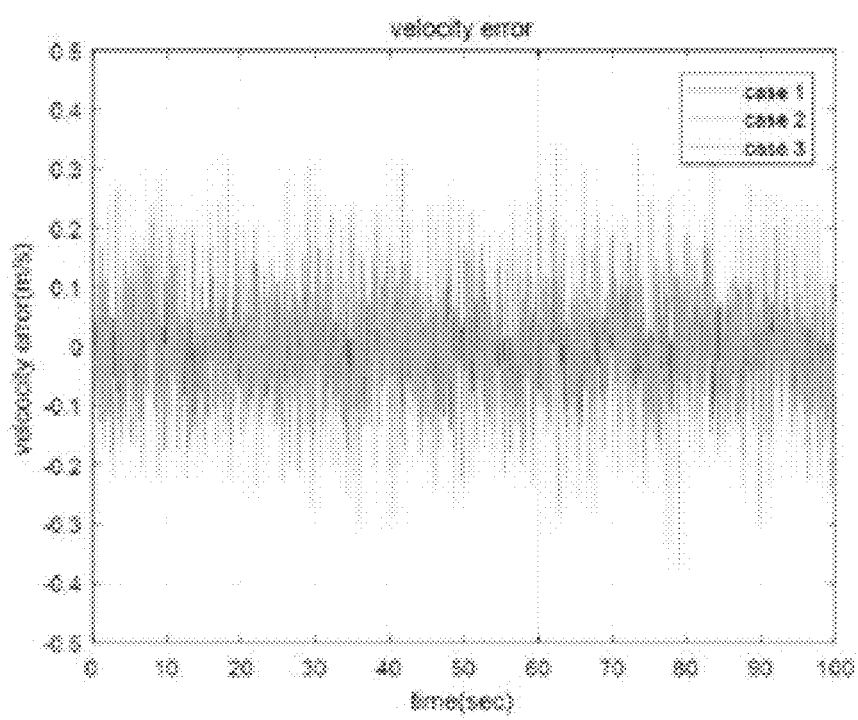
FIG. 4 is a graph showing a difference between the actual velocity of the obstacle and the velocity that is estimated with the Kalman filter.

The obstacle moved in the form of a sine wave. The velocity of the obstacle that moved at a velocity of 5 m/s to 5.1 m/s was estimated. The simulation was performed for 500 seconds. LiDAR accuracies woe set to 3 cm, 10 cm, and 20 cm, respectively, and LiDAR resolution was set to 1°. Cases 1 to 3 in each of FIGS. 2 to 4 are results of performing the simulation when the LiDAR accuracies woe set to 3 cm, 10 cm, and 20 cm, respectively.

Figure 2:
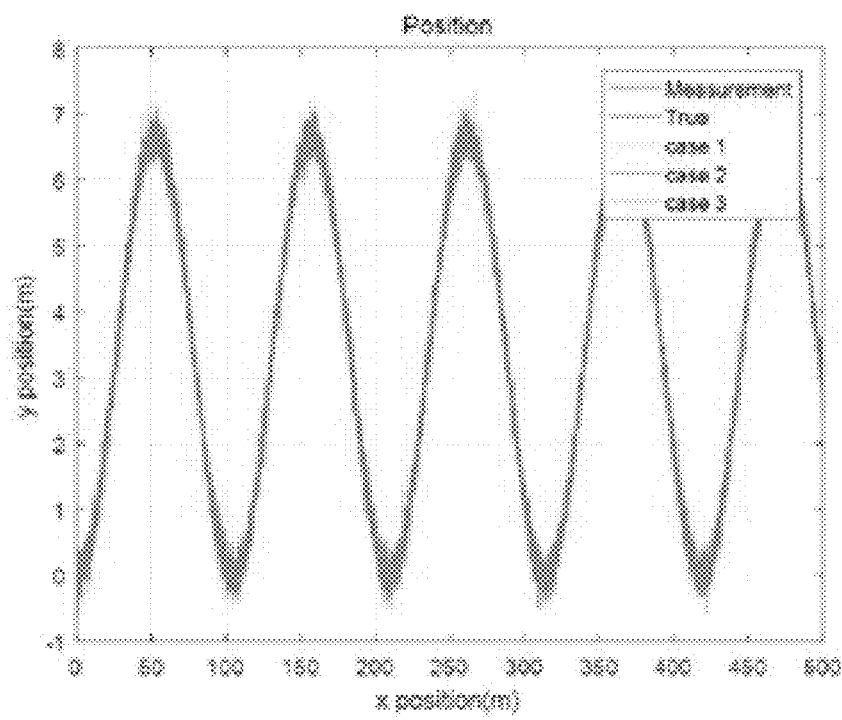
FIG. 2 is a graph comparing an actual value and a measurement value for a path along which an obstacle moves and a result obtained by applying the Kalman filter.

FIG. 2 is a graph comparing an actual value and a measurement value for a path along which the obstacle moves and a result obtained by applying the Kalman filter. FIG. 3 is a graph comparing an actual velocity of the obstacle and a velocity that is estimated with the Kalman filter. FIG. 4 is a graph showing a difference between the actual velocity of the obstacle and the velocity that is estimated with the Kalman filter.

As a result of the simulation, root mean square errors (RMSE) and maximum errors of measurement values and obstacle velocity estimation results are as shown in Table 2.

TABLE 2

|  | Case 1 | Case 2 | Case 3 |
| --- | --- | --- | --- |
| Position measurement RMSE | 0.0240 m | 0.0805 m | 0.0805 m |

TABLE 2-continued

|  | Case 1 | Case 2 | Case 3 |
|---|---|---|---|
| Position measurement maximum error | 0.1059 m | 0.4098 m | 0.6725 m |
| Position Kalman result RMSE | 0.0237 m | 0.0797 m | 0.6725 m |
| Position Kalman result maximum error | 0.1046 m | 0.4062 m | 0.6700 m |
| Velocity Kalman result RMSE | 0.0141 m/s | 0.0396 m/s | 0.0728 m/s |
| Velocity Kalman result maximum error | 0.0595 m/s | 0.1632 m/s | 0.3759 m/s |

As a result of the simulation, RMSEs of LiDAR measurement values in Case 1, Case 2, and Case 3, were 0.0240 m, 0.0805 m, and 0.0805 m, respectively. From this, it can be understood that the greater the LiDAR accuracy, the more RMSE increases. It is shown that RMSEs of estimation velocities of the obstacle are 0.0141 m/s, 0.0396 m/s and 0.0728 m/s, respectively, and that maximum errors of estimation velocities of the obstacle are 0.0595 m/s, 0.1632 m/s, and 0.3759 m/s, respectively. From this, it can be understood that estimations are made with errors of 1.2%, 32%, and 15%, respectively.

Simulation environments for the comparison of the performances of the algorithms in toms of LiDAR resolution are as shown in Table 3.

TABLE 3

|  | Case 4 | Case 5 | Case 6 |
|---|---|---|---|
| Simulation time | 500 sec | 500 sec | 500 sec |
| Step size | 0.01 sec | 0.01 sec | 0.01 sec |
| Object velocity | about 5 m/s | about 5 m/s | about 5 m/s |
| LiDAR accuracy | ±3 cm | ±3 cm | ±3 cm |
| Resolution (Horizontal) | 1° | 5° | 10° |

Figure 6:
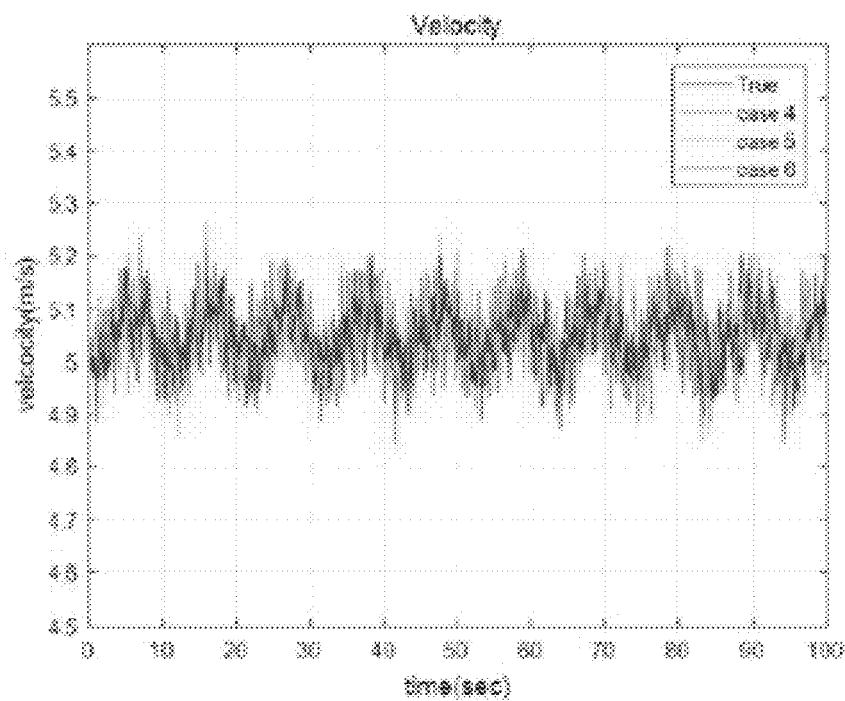
FIG. 6 is a graph comparing the actual velocity of the obstacle and the velocity that is estimated with the Kalman filter.
Figure 7:
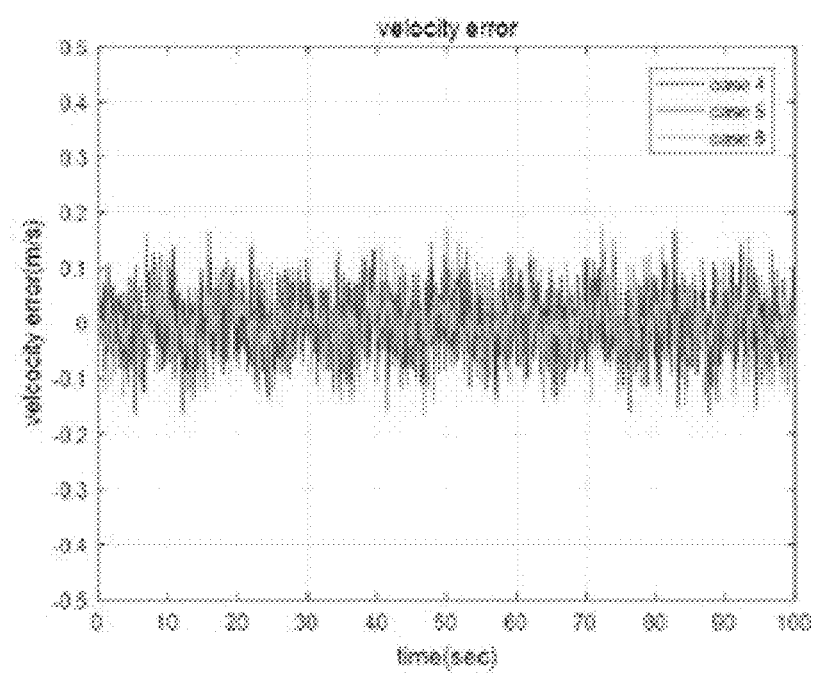
FIG. 7 is a graph showing the difference between the actual velocity of the obstacle and the velocity that is estimated with the Kalman filter.
Figure 8:
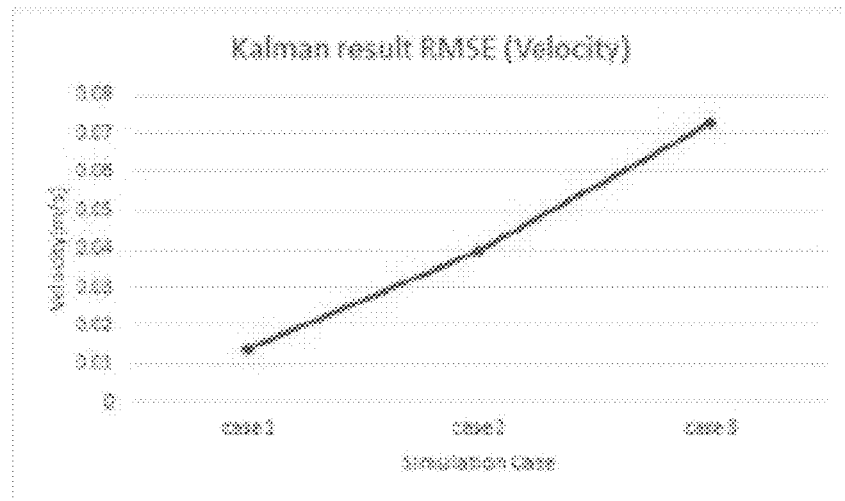
FIG. 8 is a graph illustrating a velocity estimation RMSE in toms of LiDAR accuracy.
Figure 9:
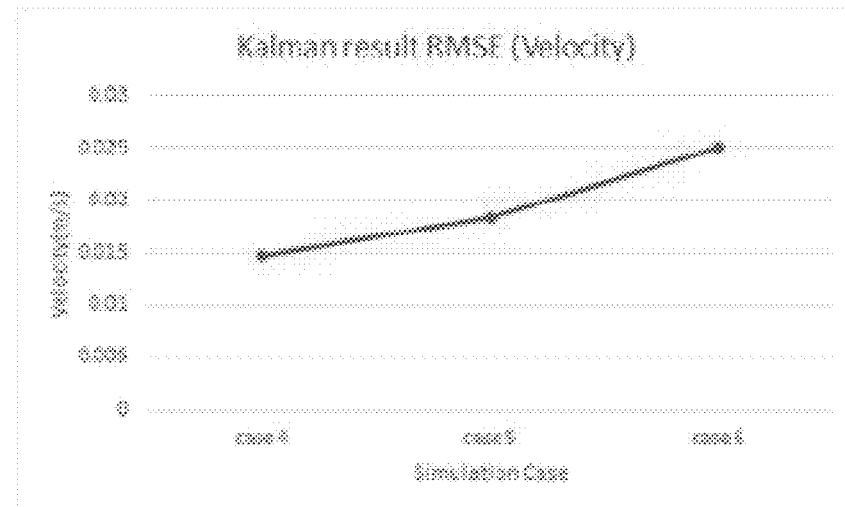
FIG. 9 is a graph illustrating a velocity estimation RMSE in toms of LiDAR resolution.
Figure 10:
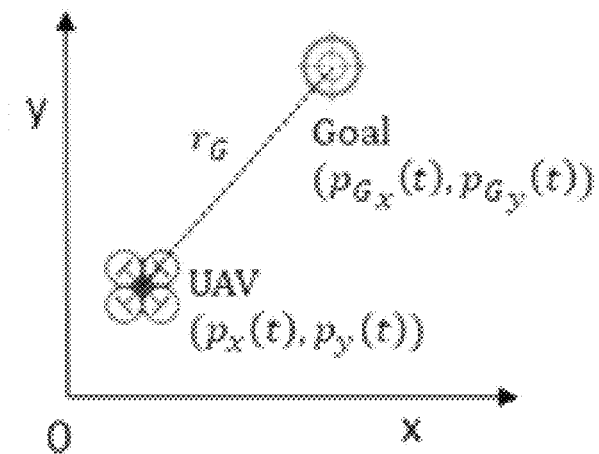
FIG. 10 is a graph illustrating attractive potential field parameters.
Figure 11:
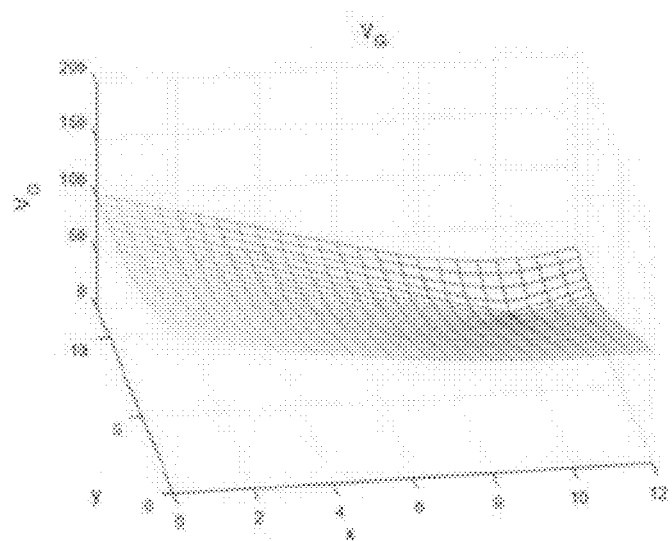
FIG. 11 is a graph illustrating an example of an attractive potential field.
Figure 12:
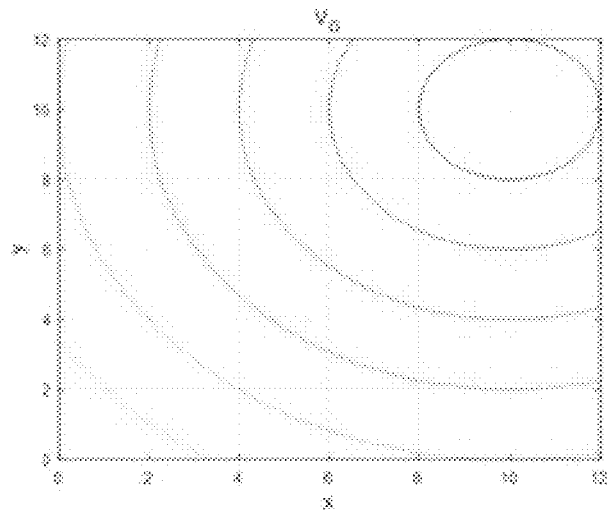
FIG. 12 is a graph illustrating an example of an attractive potential field contour.
Figure 13:
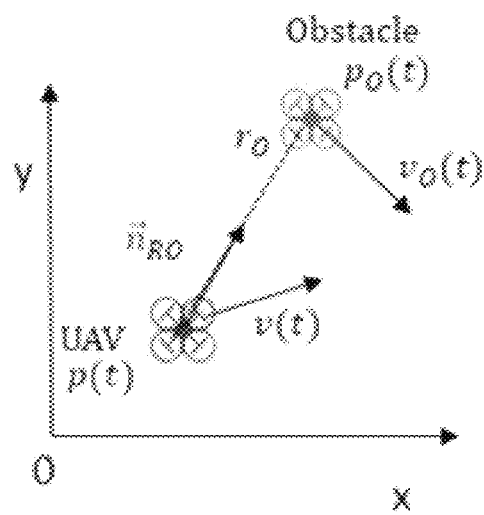
FIG. 13 is a graph illustrating repulsive potential field parameters.

Simulation time and a moving pattern and velocity of an obstacle were set to be the same as those in the previous simulation. A unit expressing the LiDAR accuracy was set to, cm. The LiDAR resolutions in Cases, 1,2, and 3 were set to 1°, 5°, and 10°, respectively. Cases 4 to 6 in FIGS. 5 to 7 are the results of the simulation that was performed when the LiDAR resolutions were set to 1°, 5°, and 10°, respectively.

Figure 5:
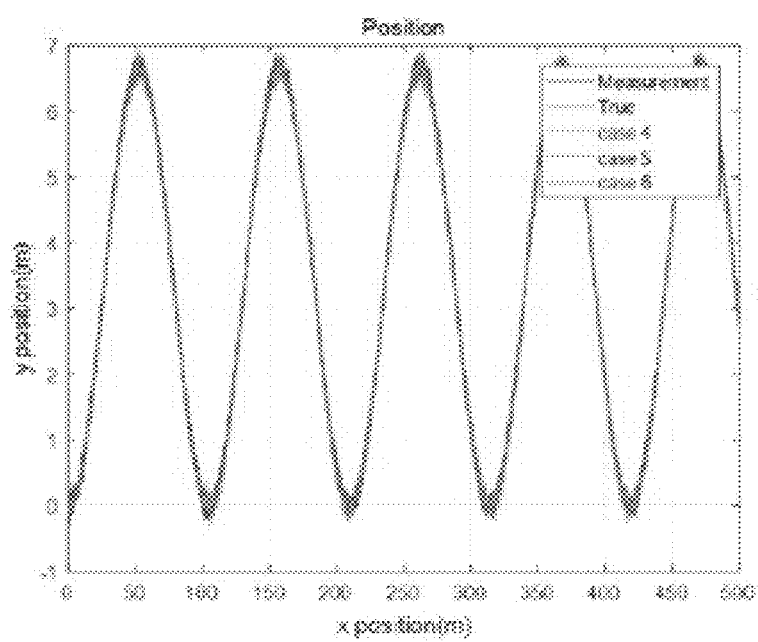
FIG. 5 is a graph comparing the actual value and the measurement value for the path along which the obstacle moves and a result for the Kalman filter.

FIG. 5 is a graph comparing the actual value and the measurement value for the path along which the obstacle moves and a result obtained by applying the Kalman filter. FIG. 6 is a graph comparing the actual velocity of the obstacle and the velocity that is estimated with the Kalman filter. FIG. 7 is a graph showing the difference between the actual velocity of the obstacle and the velocity that is estimated with the Kalman filter.

As a result of the simulation, root mean square errors (RMSE) and maximum errors of measurement values and obstacle velocity estimation results are as shown in Table 4.

TABLE 4

|  | Case 4 | Case 5 | Case 6 |
|---|---|---|---|
| Position measurement RMSE | 0.0242 m | 0.0243 m | 0.0251 m |
| Position measurement maximum error | 0.1140 m | 0.1040 m | 0.0971 m |
| Position Kalman result RMSE | 0.0240 m | 0.0240 m | 0.0248 m |

TABLE 4-continued

|  | Case 4 | Case 5 | Case 6 |
|---|---|---|---|
| Position Kalman result maximum error | 0.1129 m | 0.1035 m | 0.0964 m |
| Velocity Kalman result RMSE | 0.0146 m/s | 0.0183 m/s | 0.0250 m/s |
| Velocity Kalman result maximum error | 0.0606 m/s | 0.0553 m/s | 0.0627 m/s |

As a result of the simulation, RMSEs of LiDAR measurement values in Case 1, Case 2, and Case 3, were 0.0242 m, 0.0243 m, and 0.0251 m, respectively. From this, it can be understood that a great influence is not exerted on the LiDAR resolutions. RMSEs of estimation velocities of the obstacle are 0.0146 m/s, 0.0183 m/s, and 0.0250 m/s. From this, it can be understood that the greater the resolution, the more imprecise the velocity estimation of the obstacle. However, the maximum errors of the estimation velocities of the obstacle are 0.0606 m/s, 0.0553 m/s, and 0.0627 m/s, respectively. From this, it can be understood that an error of approximately 12% occurs and that the LiDAR resolution does not exert a great influence.

Potential is a scalar field and is computed as a minus gradient of a vector field of a conservative force. A potential field according to the present invention is formed by a force that is generated by a target point and an obstacle in a plane field. An attractive force of the potential field is generated by the target point, and a repulsive force is generated by the obstacle. The potential field is formed by adding up all attractive and repulsive forces. A force that is received by the unmanned aerial vehicle in flight is a result of adding up the attractive force ($\vec{F}_{att}$) and the repulsive force ($\vec{F}_{rep}$) that are generated by all target points and obstacles. A force ($\vec{F}_{total}$) at work that is position-dependent is a force representing a resultant force that results from adding up the attractive force of the target object and the repulsive force of the obstacle.

$$\vec{F}_{total}(p, v) = \vec{F}_{att}(p, v) + \sum_{i=1}^{n} \vec{F}_{rep}^{i}(p, v) \qquad \text{Equation 8}$$

where n denotes the number of detected obstacles. A total repulsive force is computed by adding up repulsive forces of the detected obstacles.

An obstacle avoidance motion by the potential field depends heavily on a component and direction of a force that vary according to a position of the unmanned aerial vehicle. A differential equation of the potential field (U) that varies according to a position and a relative velocity is the same as Equation 9.

$$\vec{\nabla} U(p, v) = \left[ \frac{\partial U}{\partial x} \frac{\partial U}{\partial y} \right]^T \qquad \text{Equation 9}$$

A flight trajectory of the unmanned aerial vehicle is formed along the most-steeply-descending direction of the potential field at a current position. This occurs due to a direction of a force at a current position, of the unmanned aerial vehicle, and is regarded as an optimization problem of finding a minimum value of a magnitude of the potential.

According to the present invention, the potential field is configured with an attractive potential field that is generated by the target point and represents an attractive force, and a repulsive potential field that is generated by each obstacle and represents a repulsive force.

Generally, the attractive potential field is defined as a function of a relative distance ($r_G$) between the unmanned aerial vehicle and the target point, and the target point is defined as a point fixed in space. According to the present invention, the attractive potential field is in proportion to the distance ($r_G$) between the unmanned aerial vehicle and the target point, and a coefficient ($K_G$) for an attractive force.

$$r_G(p) = \|p_G(t) - p(t)\|$$

$$U_{att} = K_G r_G \qquad \text{Equation 10}$$

where $p_G(t)$ and $p(t)$ denote the target point and the position of the unmanned aerial vehicle, respectively, and $U_{att}$ denotes the attractive potential field. An attractive force in the x- and y-directions that is obtained through partial differentiation of the attractive potential field in Equation 10 is summarized as in Equation 11.

$$F_{att_x} = -\frac{\partial U_{att}}{\partial x} = K_G \frac{(p_{Gx} - p_x)}{r_G} \qquad \text{Equation 11}$$

$$F_{att_y} = -\frac{\partial U_{att}}{\partial y} = K_G \frac{(p_{Gy} - p_y)}{r_G}$$

$$e_{Gx} = \frac{p_{Gx} - p_x}{r_G}, \; e_{Gy} = \frac{p_{Gy} - p_y}{r_G} \qquad \text{Equation 12}$$

$$F_{att_x} = K_G e_{Gx}, \; F_{att_y} = K_G e_{Gy} \qquad \text{Equation 13}$$

$e_{Gx}$ and $e_{Gy}$ in Equation 12 denote the respective directions of the unmanned aerial vehicle and the target point as unit vector components. For expression in toms of a unit vector, Equation 11 is summarized as the product of a unit vector and the coefficient of the attractive force as Equation 13. Therefore, a magnitude of the attractive force is fixed regardless of a distance between the unmanned aerial vehicle and the target point, and it can be understood that the attractive force also has a fixed influence regardless of the position of the unmanned aerial vehicle.

A general repulsive potential field is defined as a function of a distance between the unmanned aerial vehicle and the obstacle. However, in a downtown area, it is necessary to avoid collision not only with a stationary obstacle, but also with a moving obstacle, such as a vehicle, a bird, and another unmanned aerial vehicle. When the repulsive potential field is defined only as the function of the distance, the velocity of the obstacle is not taken into consideration, thereby increasing the risk of collision. According to the present invention, the collision with obstacles, including a moving obstacle and a stationary obstacle, is avoidable by applying not only the distance between the unmanned aerial vehicle and the obstacle, but also the relative velocity.

The repulsive potential field according to the present invention is generated by utilizing the distance between the unmanned aerial vehicle and the obstacle, the relative velocity, and the like. An equation for applying the distance ($r_O$) to the obstacle and the relative velocity ($v_{RO}$) is the same as Equation 14.

$$v_{RO}(t) = [v(t) - v_O(t)]^T n_{RO}$$

$$r_O(p(t), p_{O(t)}) = \|p(t) - p_O(t)\| \qquad \text{Equation 14}$$

where $v$, $v_O$ denotes the respective velocities of the unmanned aerial vehicle and the obstacle and $p_O$ denotes a position of the obstacle. In addition, $n_{RO}$ denotes a direction of a $v_{RO}$ vector. In order to efficiently avoid collision of the unmanned aerial vehicle, a braking distance ($r_m$) of the unmanned aerial vehicle and an influence range ($r_s$) of the obstacle are applied. The influence range of the obstacle may vary according to an operating environment. Generally, an operator sets the influence range of the obstacle in such a manner as to have a value suitable for the operating environment.

The repulsive potential field that results from applying the braking distance of the unmanned aerial vehicle and the influence range of the obstacle is as in Equation 15. In a case where the unmanned aerial vehicle falls out of the influence range of the obstacle, or in a case where the distance to the obstacle is constant or increases, the repulsive potential field is not generated. In a case where the distance to the obstacle increases, but falls within the influence range of the obstacle, the repulsive potential field is not defined.

$$r_m = \frac{v_{RO}^2(t)}{2a_{max}} \qquad \text{Equation 15}$$

$$U_{rep}(p, v) = \qquad \text{Equation 16}$$

$$\begin{cases} 0, & \text{if } r_O - r_m \geq r_s \text{ or } v_{RO} \leq 0 \\ K_O\left(\frac{1}{r_O - r_m} - \frac{1}{r_s}\right) & \text{if } 0 < r_O - r_m < r_s \text{ and } v_{RO} > 0 \\ \text{not defined} & v_{RO} < 0 \text{ and } r_O - r_m < r_s \end{cases}$$

$a_{max}$ in Equation 15 denotes maximum acceleration of the unmanned aerial vehicle. $K_O$ In Equation 16 denotes a coefficient of a repulsive force. Application of a general potential field to the unmanned aerial vehicle makes it necessary to adjust the coefficient of the repulsive force according to a change in the velocity of the unmanned aerial vehicle. According to the present invention, the relative velocity of the unmanned aerial vehicle with respect to the obstacle is applied. Thus, the potential field changes when the velocity of the unmanned aerial vehicle changes. Therefore, the velocity of the unmanned aerial vehicle is changeable during the flight of the unmanned aerial vehicle.

Like the attractive force, the repulsive force is obtained through the differentiation of the repulsive potential field, and it can be summarized as in Equation 17. In the case where the unmanned aerial vehicle falls out of the influence range of the obstacle or in the case where the distance to the obstacle is constant or increases, the repulsive force is not generated. In the case where the distance to the obstacle increases but falls within the influence range of the obstacle, the repulsive force is not defined, $$F_{rep}(p, v) = \begin{cases} 0, & \text{if } r_O - r_m \geq r_s \text{ or } v_{RO} \leq 0 \\ F_{rep1} + F_{rep2} & \text{if } 0 < r_O - r_m < r_s \text{ and } v_{RO} > 0 \\ \text{not defined} & v_{RO} < 0 \text{ and } r_O - r_m < r_s \end{cases} \qquad \text{Equation 17}$$

$$F_{rep1} = K_O U_{rep}^2 \left(1 + \frac{v_{RO}(t)}{a_{max}}\right) n_{OR}$$

$$F_{rep2} = \frac{K_O U_{rep}^2 v_{RO}(t) v_{RO\perp}}{a_{max} r_O(p(t), p_O(t))} n_{OR\perp}$$

where $F_{rep1}$ denotes a repulsive force that is generated, in the direction of the obstacle, in the unmanned aerial vehicle, $F_{rep2}$ denotes a repulsive force that is generated in a direction vertical to $F_{rep1}$, $v_{RO\perp}$ is a component in the vertical direction, of a $v_{RO}$ vector, $n_{RO\perp}$ is a component in the vertical direction, $v_{RO}$ of a vector and $n_{RO}$ is a reverse vector of $n_{RO}$.

Figure 14:
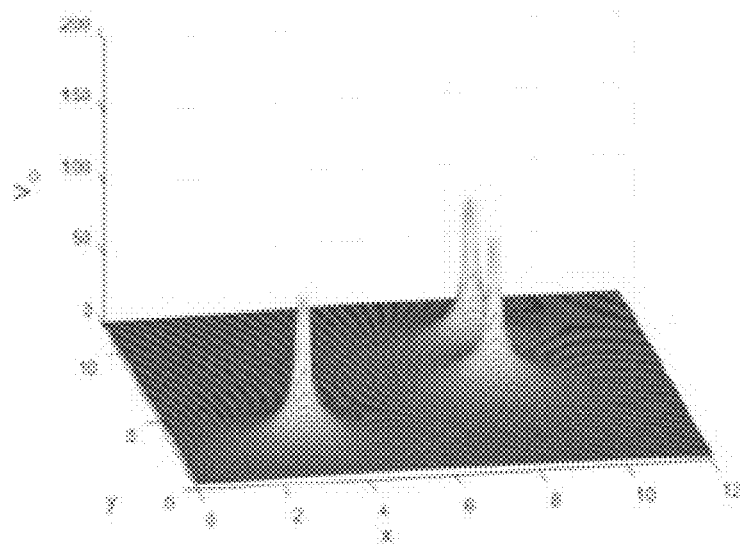
FIG. 14 is a graph illustrating an example of a repulsive potential field.
Figure 15:
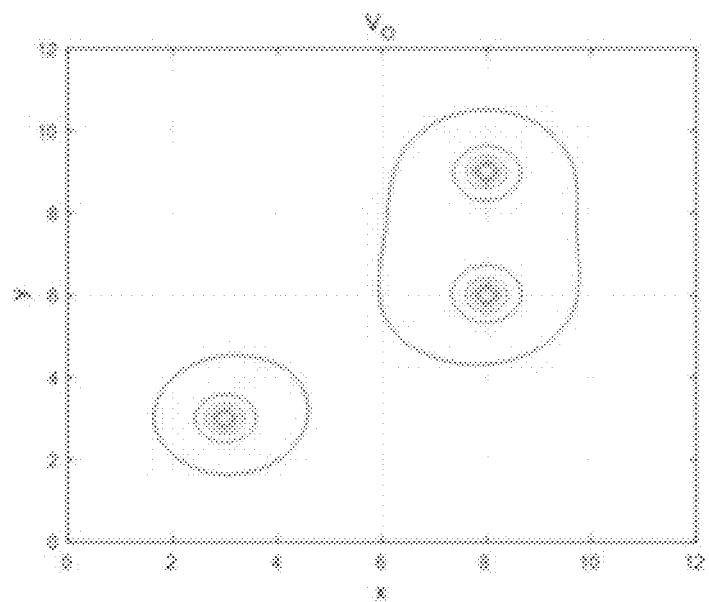
FIG. 15 is a graph illustrating an example of a repulsive potential field contour.

FIGS. 14 and 15 illustrate the respective examples, respectively, of the repulsive potential field and a repulsive potential field contour that result when it is assumed that there is no motion of the obstacle. Coordinates of the obstacle are (3,3), (8,6), and (8,9).

A local minimum in analytics means a function value at a minimum point. That is, various local minimums may be present as function values that are minimized at all points in the vicinity, in a high-order function.

The collision avoidance algorithm based on the potential field is an algorithm for avoiding the obstacle while moving in a gradient descent direction of a potential force. The collision avoidance based on the potential field may lead to the local minima phenomenon where a minimum value of the potential field is reached locally before reaching a target point. In this potential field, there are three types of situations where a minimum value occurs locally instead of occurring at a final target point.

Figure 16:
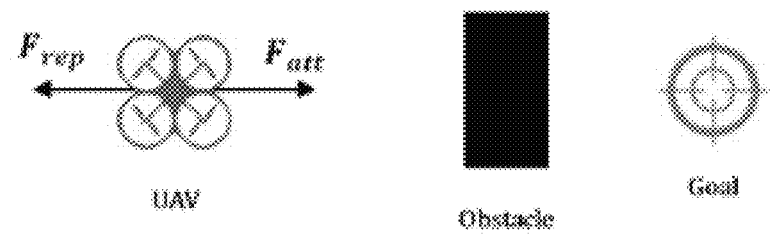
FIG. 16 is a diagram illustrating the first local minima.

First in a case where the unmanned aerial vehicle, the obstacle, and the target point are on the same line and where the obstacle is positioned between the unmanned aerial vehicle and the target point the local minima phenomenon may occur. In such a case, when the attractive force and the repulsive force are the same, the unmanned aerial vehicle can hover at a fixed position without moving to the target point. FIG. 16 illustrates in the first local minima.

Figure 17:
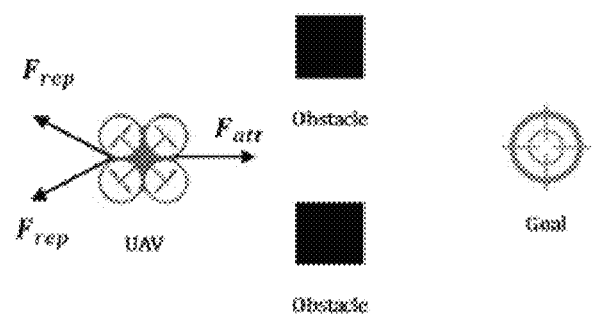
FIG. 17 is a diagram illustrating the second local minima.

Second, in a case where the unmanned aerial vehicle moves toward the target point and obstacles are positioned to the left and right, respectively, of a moving path, the local minima phenomenon may also occur. When the repulsive force that is generated by the respective obstacles on the left and right of the path to the target point and the attractive force that is generated by the target point are balanced, the unmanned aerial vehicle may not move to the target point. FIG. 17 illustrates the second local minima.

Figure 18:
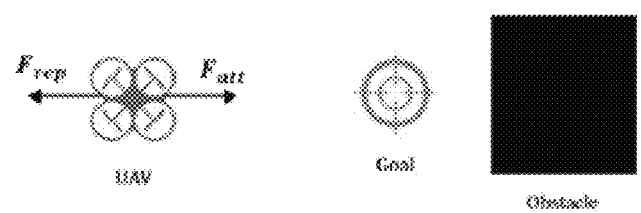
FIG. 18 is a diagram illustrating the third local minima.

Third, in a case where the target point is positioned within the range where the obstacle exerts an influence and where the repulsive force generated by the obstacle is greater than the attractive force generated by the target point, the local minima phenomenon where the unmanned aerial vehicle cannot reach the target point may occur. FIG. 18 illustrates the third local minima.

When the attractive force generated by the target point and the repulsive force generated by the obstacle are balanced, the local minima phenomenon occurs. Therefore, in an environment where obstacles are present, such as in a downtown area, there is a high likelihood that the local minima phenomenon will occur.

Figure 19:
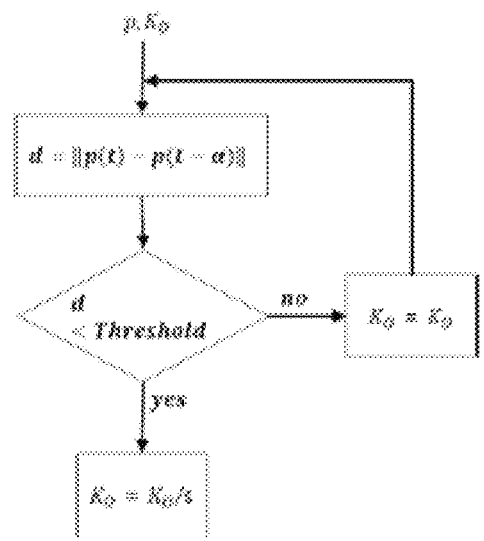
FIG. 19 is a flowchart illustrating a local minima algorithm.

According to the present invention, in a case where an amount of change in the position of the unmanned aerial vehicle is below a threshold, it is determined that the local minima phenomenon occurs. Then, an attempt was made to overcome the local minima by changing the coefficient of the repulsive force. d in FIG. 19 denotes a distance the unmanned aerial vehicle moves for a fixed time, and α denotes the time for determining the local minima. $K_O$ denotes a coefficient of the repulsive force. s is a variable for setting an amount of change in the coefficient of the repulsive force in a case where it is determined that the local minima occurs. According to the present invention, s is set to a number that is greater than 1 in such a manner that the coefficient of the repulsive force is reduced in a case where an amount of motion is small.

The collision avoidance algorithm based on the potential field uses a method in which the collision with the obstacle is avoided by moving in the direction of the potential force computed through the differentiation of the potential field.

As in Equation 10, the attractive potential field that is used for the collision avoidance algorithm is generated in proportion to the distance between the unmanned aerial vehicle and the target point. As in Equation 16, the repulsive potential field is generated by reflecting not only the distance between the unmanned aerial vehicle and the obstacle but also the relative velocity. The respective characteristics of the unmanned aerial vehicle and the obstacle are reflected by utilizing parameters such as the braking distance and the influence of the obstacle. The potential force is obtained by differentiating the sum of the generated attractive potential field and repulsive potential field, and the obtained potential force is utilized for guided navigation of the unmanned aerial vehicle. An equation for the potential force and an equation for heading control of the unmanned aerial vehicle in the direction of the potential force are the same as Equations 18 to 20.

$$F_x = F_{attx} + F_{1repx} + F_{2repx} + \cdots + F_{nrepx} \qquad \text{Equation 18}$$

$$F_y = F_{atty} + F_{1repy} + F_{2repy} + \cdots + F_{nrepy}$$

$$\psi_{CMD} = \tan^{-1}\left(\frac{F_y}{F_x}\right) \qquad \text{Equation 19}$$

$$\beta = K_C(\psi_{CMD} - \psi) \qquad \text{Equation 20}$$

Figure 20:
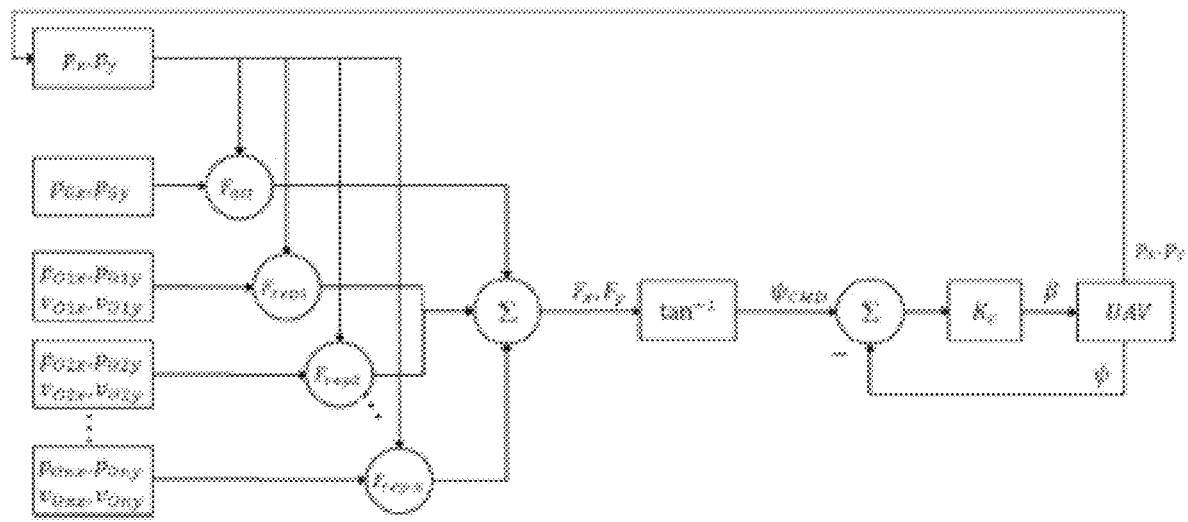
FIG. 20 is a diagram illustrating a collision avoidance algorithm.

In Equation 20, $K_C$ denotes a control coefficient, and β denotes a direction control value of the unmanned aerial vehicle. FIG. 20 is a flowchart for the collision avoidance algorithm based on the potential field. The potential forces in the horizontal and vertical axes, which are generated by the potential field, are computed based on a current position and a target point that are measured and set, respectively, in the unmanned aerial vehicle and information on the obstacle measured in LiDAR. The direction of the potential force is computed using an arctangent in the potential forces in the horizontal and vertical axes, and a heading command of the unmanned aerial vehicle is determined in the direction of the potential force. The heading of the unmanned aerial vehicle is controlled with a value that results from multiplying a heading error of the unmanned aerial vehicle by a heading control coefficient FIG. 20 illustrates a collision avoidance algorithm according to the present invention.

The embodiment of the present invention is described only in an exemplary manner referring to the drawings. It will be apparent to a person of ordinary skill in the art to which the present invention pertains that various other modifications and equivalents are possible from this description.

What is claimed is:

1. A method of avoiding collision of an unmanned aerial vehicle with an obstacle, the method comprising:
    calculating two potential fields using current positional information of the unmanned aerial vehicle, a target point that is set, and positional information of the obstacle measured by a sensor;
    computing an attractive force and a repulsive force by differentiating the two potential fields, respectively;
    computing a direction of a potential force that results from adding up the attractive force and the repulsive force; and performing to control the direction of the potential force in a direction of the unmanned aerial vehicle moves, wherein the calculating two potential fields include:

an attractive potential field that is computed with the current positional information of the unmanned aerial vehicle and the target point that is set, and a repulsive potential field that is computed with the current positional information of the unmanned aerial vehicle and positional information of the obstacle, wherein the repulsive potential field is proportional to a coefficient of the repulsive force that is a set coefficient, and wherein a change in a position of the unmanned aerial vehicle for a set time is computed, the coefficient of the repulsive force is reduced when a computed change in the position of the unmanned aerial vehicle is smaller than a setting value, and a case where the computed change in the position of the unmanned aerial vehicle is smaller than the setting value for the given time includes a situation where the target point is positioned within a range where the obstacle exerts an influence and the repulsive force that is generated by the obstacle is greater than the attractive force that is generated by the target point.

2. The method according to claim 1, wherein the attractive potential field is computed using following equations:

$$r_G(p) = \|p_G(t) - p(t)\|$$

$$U_{att} = K_G r_G$$

where $r_G$ denotes a distance between the unmanned aerial vehicle and the target point, $K_G$ denotes a coefficient of the attractive force, $P_G(i)$ denotes the target point, $p(t)$ denotes the position of the unmanned aerial vehicle, and $U_{att}$ denotes the attractive potential field.

3. The method according to claim 2, wherein the attractive force is computed from the attractive potential field, and the attractive force is computed using following equations:

$$F_{att_z} = -\frac{\partial U_{att}}{\partial x} = K_G \frac{(p_{Gz} - p_z)}{r_G}$$

$$F_{att_y} = -\frac{\partial U_{att}}{\partial y} = K_G \frac{(p_{Gy} - p_y)}{r_G}.$$

4. The method according to claim 3, wherein the repulsive potential field is computed using following equations:

$$U_{rep}(p, v) = \begin{cases} 0, & \text{if } r_O - r_m \geq r_s \text{ or } v_{RO} \leq 0 \\ K_O\left(\frac{1}{r_O - r_m} - \frac{1}{r_s}\right) & \text{if } 0 < r_O - r_m < r_s \text{ and } v_{RO} > 0 \\ \text{not defined} & v_{RO} < 0 \text{ and } r_O - r_m < r_s \end{cases}$$

where $r_O$ denotes a distance between the unmanned aerial vehicle and the obstacle, and $v_{RO}$ denotes the respective relative velocities of the unmanned aerial vehicle and the obstacle;

$$v_{RO}(t) = [v(t) - v_O(t)]^T n_{RO}$$

$$r_O(p(t), p_O(t)) = \|p(t) - p_O(t)\|$$

where v' denotes a velocity of the unmanned aerial vehicle, $v_{O'}$ denotes a velocity of the obstacle, $p_O$ denotes a position of the obstacle, $r_m$ denotes a braking distance of the unmanned aerial vehicle, and $r_s$ denotes an influence range of the obstacle; and $$r_m = \frac{v_{RO}^2(t)}{2a_{max}}$$

where $a_{max}$ denotes maximum acceleration of the unmanned aerial vehicle, $K_{O'}$ denotes the coefficient of the repulsive force, and $n_{RO'}$ denotes a direction of a $v_{RO}$ vector.

5. The method according to claim 4, wherein the repulsive force is computed from the repulsive potential field, and the repulsive force is computed using following equations:

$$F_{rep}(p, v) = \begin{cases} 0, & \text{if } r_O - r_m \geq r_s \text{ or } v_{RO} \leq 0 \\ F_{rep1} + F_{rep2} & \text{if } 0 < r_O - r_m < r_s \text{ and } v_{RO} > 0 \\ \text{not defined} & v_{RO} < 0 \text{ and } r_O - r_m < r_s \end{cases}$$

$$F_{rep1} = K_O U_{rep}^2 \left(1 + \frac{v_{RO}(t)}{a_{max}}\right) n_{OR}$$

$$F_{rep2} = \frac{K_O U_{rep}^2 v_{RO}(t) v_{RO\perp}}{a_{max} r_O(p(t), p_O(t))} n_{OR\perp}$$

where $F_{rep1}$ denotes the repulsive force that is generated, in a direction of the obstacle, in the unmanned aerial vehicle, $F_{rep2}$ denotes the repulsive force that is generated in a direction vertical to $F_{rep1}$, $v_{RO\perp}$ denotes a magnitude in a vertical direction, of $v_{RO}$ vector, $n_{RO'}$ denotes a component in the vertical direction, of a $v_{RO}$ vector and $n_{OR}$ is a reverse vector of $n_{RO'}$.

6. The method according to claim 1, wherein a heading of the unmanned aerial vehicle is controlled through a collision avoidance algorithm based on the potential field, the direction of the potential force is computed using an arctangent in the potential forces in horizontal and vertical axes, and the heading of the unmanned aerial vehicle is controlled with a value from multiplication of a heading error of the unmanned aerial vehicle and a heading control coefficient.

7. A method of avoiding collision of an unmanned aerial vehicle with an obstacle, the method comprising:

calculating two potential fields using current positional information of the unmanned aerial vehicle, a target point that is set, and positional information of the obstacle measured by a sensor;

computing an attractive force and a repulsive force by differentiating the two potential fields, respectively;

computing a direction of a potential force that results from adding up the attractive force and the repulsive force; and performing to control the direction of the potential force in a direction of the unmanned aerial vehicle moves, wherein a repulsive potential field is computed using following equations:

$$U_{rep}(p, v) = \begin{cases} 0, & \text{if } r_O - r_m \geq r_s \text{ or } v_{RO} \leq 0 \\ K_O\left(\dfrac{1}{r_O - r_m} - \dfrac{1}{r_s}\right) & \text{if } 0 < r_O - r_m < r_s \text{ and } v_{RO} > 0 \\ \text{not defined} & v_{RO} < 0 \text{ and } r_O - r_m < r_s \end{cases}$$

where $r_O$ denotes a distance between the unmanned aerial vehicle and the obstacle, and $v_{RO}$ denotes respective relative velocities of the unmanned aerial vehicle and the obstacle;

$$v_{RO}(t) = [v(t) - v_O(t)]^T n_{RO}$$

$$r_O(p(t), p_O(t)) = \|p(t) - p_O(t)\|$$

where $v'$ denotes a velocity of the unmanned aerial vehicle, $v_{O'}$ denotes a velocity of the obstacle, $p_O$ denotes a position of the obstacle, $r_m$ denotes a braking distance of the unmanned aerial vehicle, and $r_s$ denotes an influence range of the obstacle;

$$r_m = \frac{v_{RO}^2(t)}{2a_{max}}$$

where $a_{max}$ denotes maximum acceleration of the unmanned aerial vehicle, $K_{O'}$ denotes a coefficient of the repulsive force, and $n_{RO'}$ denotes a direction of a $v_{RO}$ vector.

8. The method according to claim 7, wherein the calculating two potential fields include:
an attractive potential field that is computed with the current positional information of the unmanned aerial vehicle and the target point that is set,
the repulsive potential field that is computed with the current positional information of the unmanned aerial vehicle and the positional information of the obstacle, and
the attractive potential field is computed using following equations:

$$r_G(p) = \|p_G(t) - p(t)\|$$

$$U_{att} = K_G r_G$$

where $r_G$ denotes a distance between the unmanned aerial vehicle and the target point, $K_{G'}$ denotes a coefficient of the attractive force, $p_G(t)$ denotes the target point, $p(t)$ denotes a position of the unmanned aerial vehicle, and $U_{att}$ denotes the attractive potential field.

9. The method according to claim 7, wherein the attractive force is computed from the attractive potential field, and the attractive force is computed using following equations:

$$F_{att_x} = \frac{\partial U_{att}}{\partial x} = K_G \frac{(p_{Gx} - p_x)}{r_G}$$

$$F_{att_y} = -\frac{\partial U_{att}}{\partial y} = K_G \frac{(p_{Gy} - p_y)}{r_G}$$

10. The method according to claim 7, wherein the repulsive force is computed from the repulsive potential field, and the repulsive force is computed using following equations:

$$F_{rep}(p, v) = \begin{cases} 0, & \text{if } r_O - r_m \geq r_s \text{ or } v_{RO} \leq 0 \\ F_{rep1} + F_{rep2} & \text{if } 0 < r_O - r_m < r_s \text{ and } v_{RO} > 0 \\ \text{not defined} & v_{RO} < 0 \text{ and } r_O - r_m < r_s \end{cases}$$

$$F_{rep1} = K_O U_{rep}^2 \left(1 + \frac{v_{RO}(t)}{a_{max}}\right) n_{OR}$$

$$F_{rep2} = \frac{K_O U_{rep}^2 v_{RO}(t) v_{RO\perp}}{a_{max} r_O(p(t), p_O(t))} n_{OR\perp}$$

where $F_{rep1}$ denotes the repulsive force that is generated, in a direction of the obstacle, in the unmanned aerial vehicle, $F_{rep2}$ denotes the repulsive force that is generated in a direction vertical to $F_{rep1}$, $v_{RO\perp}$ denotes a magnitude in a vertical direction, of $v_{RO}$ vector, $n_{RO'}$ denotes a component in the vertical direction, of a $v_{RO}$ vector and $n_{OR}$ a reverse vector of $n_{RO'}$.

11. The method according to claim 10, wherein a change in the position of the unmanned aerial vehicle is computed for a given time,
the coefficient of the repulsive force is reduced when a computed change in the position of the unmanned aerial vehicle is smaller than a setting value, and
a case that the computed change in the position of the unmanned aerial vehicle is smaller than the setting value for the given time, includes:
a situation that the obstacle is positioned between the unmanned aerial vehicle and the target point, and the unmanned aerial vehicle, the obstacle, and the target point are on the same line,
a situation that the unmanned aerial vehicle moves toward the target point and obstacles are positioned to the left and right, respectively, of a moving path, and
a situation that the target point is positioned within a range where the obstacle exerts an influence and the repulsive force that is generated by the obstacle is greater than the attractive force that is generated by the target point.

12. The method according to claim 7, wherein a heading of the unmanned aerial vehicle is controlled through a collision avoidance algorithm based on the potential field,
the direction of the potential force is computed using an arctangent in the potential forces in horizontal and vertical axes, and
the heading of the unmanned aerial vehicle is controlled with a value from multiplication of a heading error of the unmanned aerial vehicle and a heading control coefficient.

13. A method of avoiding collision of an unmanned aerial vehicle with an obstacle, the method comprising:
calculating two potential fields using current positional information of the unmanned aerial vehicle, a target point that is set, and positional information of the obstacle measured by a sensor;
computing an attractive force and a repulsive force by differentiating the two potential fields, respectively;
computing a direction of a potential force that results from adding up the attractive force and the repulsive force; and
performing to control the direction of the potential force in a direction of the unmanned aerial vehicle moves,
wherein the calculating two potential fields include:
an attractive potential field that is computed with the current positional information of the unmanned aerial vehicle and the target point that is set, a repulsive potential field that is computed with the current positional information of the unmanned aerial vehicle and the positional information of the obstacle, the attractive potential field is computed using following equations:

$$r_G(p) = \|p_G(t) - p(t)\|$$

$$U_{att} = K_G r_G$$

where $r_G$ denotes a distance between the unmanned aerial vehicle and the target point, $K_{G'}$ denotes a coefficient of the attractive force, $p_G(t)$ denotes the target point, $p(t)$ denotes a position of the unmanned aerial vehicle, and $U_{att}$ denotes the attractive potential field, and wherein the attractive force is computed from the attractive potential field, and the attractive force is computed using following equations:

$$F_{att_x} = -\frac{\partial U_{att}}{\partial x} = K_G \frac{(p_{Gx} - p_x)}{r_G}$$

$$F_{att_y} = -\frac{\partial U_{att}}{\partial y} = K_G \frac{(p_{Gy} - p_y)}{r_G},$$

and wherein a repulsive potential field is computed using following equations:

$$U_{rep}(p, v) = \begin{cases} 0, & \text{if } r_O - r_m \geq r_s \text{ or } v_{RO} \leq 0 \\ K_O\left(\frac{1}{r_O - r_m} - \frac{1}{r_s}\right) & \text{if } 0 < r_O - r_m < r_s \text{ and } v_{RO} > 0 \\ \text{not defined} & v_{RO} < 0 \text{ and } r_O - r_m < r_s \end{cases}$$

where $r_O$ denotes a distance between the unmanned aerial vehicle and the obstacle, and $v_{RO}$ denotes respective relative velocities of the unmanned aerial vehicle and the obstacle;

$$vhd\ RO(t) = [v(t) - v_O(t)]^T n_{RO}$$

$$r_O(p(t), p_O(t)) = \|p(t) - p_O(t)\|$$

where v' denotes a velocity of the unmanned aerial vehicle, $v_{O'}$ denotes a velocity of the obstacle, $p_O$ denotes a position of the obstacle, $r_m$ denotes a braking distance of the unmanned aerial vehicle, and $r_s$ denotes an influence range of the obstacle;

$$r_m = \frac{v_{RO}^2(t)}{2a_{max}}$$

where $a_{max}$ denotes maximum acceleration of the unmanned aerial vehicle, $K_{O'}$ denotes a coefficient of the repulsive force, and $n_{RO'}$ denotes a direction of a $v_{RO}$ vector.

14. The method according to claim 13, wherein the repulsive force is computed from the repulsive potential field, and the repulsive force is computed using following equations:

$$F_{rep}(p, v) = \begin{cases} 0, & \text{if } r_O - r_m \geq r_s \text{ or } v_{RO} \leq 0 \\ F_{rep1} + F_{rep2} & \text{if } 0 < r_O - r_m < r_s \text{ and } v_{RO} > 0 \\ \text{not defined} & v_{RO} < 0 \text{ and } r_O - r_m < r_s \end{cases}$$

$$F_{rep1} = K_O U_{rep}^2 \left(1 + \frac{v_{RO}(t)}{a_{max}}\right) n_{OR}$$

$$F_{rep2} = \frac{K_O U_{rep}^2 v_{RO}(t) v_{RO\perp}}{a_{max} r_O(p(t), p_O(t))} n_{OR\perp}$$

where $F_{rep1}$ denotes the repulsive force that is generated, in a direction of the obstacle, in the unmanned aerial vehicle, $F_{rep2}$ denotes the repulsive force that is generated in a direction vertical to $F_{rep1}$, $v_{RO\perp}$ denotes a magnitude in a vertical direction, of $v_{RO}$ vector, $n_{RO'}$ denotes a component in the vertical direction, of a $v_{RO}$ vector and $n_{OR}$ is a reverse vector of $n_{RO'}$.

15. The method according to claim 13, wherein a heading of the unmanned aerial vehicle is controlled through a collision avoidance algorithm based on the potential field, the direction of the potential force is computed using an arctangent in the potential forces in horizontal and vertical axes, and the heading of the unmanned aerial vehicle is controlled with a value from multiplication of a heading error of the unmanned aerial vehicle and a heading control coefficient.

* * * * *